(12) United States Patent
Ryan et al.

(10) Patent No.: US 8,452,684 B1
(45) Date of Patent: May 28, 2013

(54) METHOD AND SYSTEM FOR CREATION OF A FLOATING RATE POOLED INDEX

(75) Inventors: Ronald Ryan, Jupiter, FL (US); Stephen Tanzer, Eads, TN (US); Robert Judge, Chagrin Falls, OH (US)

(73) Assignee: SB Indexes, LLC, Chagrin Falls, OH (US)

( * ) Notice: Subject to any disclaimer, the term of this patent is extended or adjusted under 35 U.S.C. 154(b) by 0 days.

(21) Appl. No.: 13/442,922

(22) Filed: Apr. 10, 2012

(51) Int. Cl.
*G06Q 40/00* (2006.01)
(52) U.S. Cl.
USPC .......................................... 705/36 R; 705/30
(58) Field of Classification Search
USPC ...................................... 705/10–44
See application file for complete search history.

(56) References Cited

U.S. PATENT DOCUMENTS

| | | | | |
|---|---|---|---|---|
| 4,742,457 A | * | 5/1988 | Leon et al. | 705/35 |
| 5,742,775 A | * | 4/1998 | King | 705/38 |
| 6,148,293 A | * | 11/2000 | King | 705/35 |
| 7,720,752 B2 | * | 5/2010 | Uhlmann et al. | 705/38 |
| 7,769,657 B2 | * | 8/2010 | Chacko et al. | 705/35 |
| 8,112,341 B2 | * | 2/2012 | Chacko et al. | 705/36 R |
| 8,121,924 B1 | * | 2/2012 | Leon et al. | 705/36 R |
| 2007/0078744 A1 | * | 4/2007 | Koss et al. | 705/36 R |
| 2010/0293091 A1 | * | 11/2010 | Kurczodyna | 705/38 |
| 2012/0095939 A1 | * | 4/2012 | Chacko et al. | 705/36 R |

* cited by examiner

*Primary Examiner* — Frantzy Poinvil
(74) *Attorney, Agent, or Firm* — Joseph R. Carvalko, Jr.

(57) ABSTRACT

A method A computer-implemented method of creating an SBA 7 (a) index of floating rate pools comprising: (1) forming one or more candidate pools based on specific characteristics of SBA 7 (a) floating rate pools; (2) determining one or more selection criteria for including one or more candidate pools in an index; (3) comparing the one or more candidate pools to the selection criteria; (4) and if the criteria is met, then (5) weighting the pool and (6) storing said pool in the index.

23 Claims, 2 Drawing Sheets

US 8,452,684 B1

METHOD AND SYSTEM FOR CREATION OF A FLOATING RATE POOLED INDEX

FIELD OF INVENTION

The invention relates generally to investment bond markets and a method and system, as implemented by a software program on a computer system, for the construction and maintenance of a SBA 7 (a) floating rate pool index.

BACKGROUND

An index is a statistical composite that is used to indicate the performance of a market or a market sector over various time periods. Examples of indices that are used to gauge the performance of stocks, bonds and other securities in the United States include the Dow Jones Industrial Average, the National Association of Securities Dealers Automated Quotations (NASDAQ) Composite Index, the New York Stock Exchange (NYSE) Composite Index, etc. In general, the Dow Jones Industrial Average contains thirty (30) stocks that trade on the NYSE as well as NASDAQ, and is a general indicator of how shares of the largest United States companies are trading. The NASDAQ Composite Index is a composite index of more than three thousand (3,000) companies listed on the NASDAQ (also referred to as over-the-counter or OTC stocks). It is designed to indicate the stock performance of small-cap and technology stocks. Finally, the New York Stock Exchange Composite Index is a composite index of shares listed on the New York Stock Exchange. No index exists for certain types of pooled financial instruments, such as Small Business Administration SBA 7(a) loans.

The SBA is an independent U.S. federal agency created for the protection of the interests of small business. There are more than 27 million small businesses in the U.S. that employ more than half of all private sector employees and generate 65% of net new jobs as measured between 1993 and 2009. SBA 7(a) loans are the largest component of the SBA's business loan program. These loans are only available on a government guaranteed basis, which range from 75% to 90% of the loan having a $5 million maximum loan amount. The guarantee loan program originates from a commercial lender.

The guaranteed portion of the loan is eligible to be sold and then pooled into securities under the SBA 7 (a) Pooling Program. The SBA Pools are referred to as pass-through securities where pool assemblers actively bid on the loans, aggregate the loans thus acquired through bidding, and optionally pass them into the securities market for trading. Approximately 95% of those reaching the market are floating rate pools. All the pools are issued with an original face amount of the bonds. By way of example, 10 individual loans may comprise a $10,000,000 pool, whereby a monthly principal and interest paid by the borrowers of the underlying loans is passed through to an investor in the pool, based on the investor's pro rata share of the pool.

The SBA pools amortize and are issued with an original face amount of the pool and begin with a factor of 1.0000. Each month following the issuance month, as principal is paid down by the borrower, the factor is reduced. When the last dollar of principal is paid back the factor will be 0.000000. A factor is calculated by dividing the current face amount of the pool by the original face amount of the pool.

Although over different periods, requirements for pool parameters can change, by way of example, as of January 2011, the pools must have had the following characteristics: (a) a minimum original pool size of $1.0 million, (b) a minimum of four (4) loans in a pool, (c) that no single loan could consist of more than 25% of a pool for standard pools, (d) that no single loan could consist of more than 10% of a pool for Weighted Average Coupon (WAC) pools, (f) a maximum difference in borrower rates would be limited to 2%, (g) all loans in a pool required a monthly repayment schedule, (h) loans could vary in remaining maturity by no more than 20% for standard pools, (i) loans could vary in remaining maturity by no more than 24% for WAC pools and (j) prepayment penalties on loans with original maturities of 15 years of longer. SBA 7(a) loans have a loan amortization of monthly principal payments in addition to possible prepayments. Such principal prepayments are referred to as the constant prepayment rate (CPR) within the SBA industry. The CPR is calculated as the total dollar amount of notional value loan payoffs as an annualized percentage of the total outstanding notional loan value. The principal pay-downs (amortization plus prepayment) are reported with a two month lag, such that the pay-down return, for example February is based on the reported December prepayment data. The CPR is sometimes referred to as the prepayment speed. High prepayment speed CPR will reduce the income to the investor or lender.

Currently, there are no reliable SBA 7 (a) floating rate pool indices to assist the market in making considered judgments about investing a pool. An index of SBA 7 (a) issued pools would provide investors a reliable bond-like investment if an index was constructed from pools with certain characteristics. Therefore, a need exists to create the universe of pools having certain characteristics and from that universe a selection process for inclusion of these pools in an index that reflects the performance to SBA 7 (a) pools held for investment. The magnitude and complexity dealing with the dynamics of such pools also necessitates an automation process by which the pools having certain characteristics are identified and the application of selection criteria to qualify only those pools that produce an investor quality index.

SUMMARY OF THE INVENTION

The present invention includes a computer-implemented method of creating and managing an index fund based on SBA 7 (a) floating rate pools of loans, including the steps of: (1) forming one or more candidate pools based on specific characteristics of SBA 7 (a) floating rate pools; (2) determining a selection criteria for including one or more candidate pools in an index; (3) comparing the one or more candidate pools to the selection criteria, (4) and if the selection criteria are met, then (5) weighting the pool and (6) storing said pool in the index.

The present invention includes a non-transitory computer-readable medium having stored thereon computer-readable instructions for implementing a method comprising: (1) forming one or more candidate pools based on specific characteristics of SBA 7 (a) floating rate pools; (2) determining one or more selection criteria for including one or more candidate pools in an index; (3) comparing the one or more candidate pools to the selection criteria, (4) and if the selection criteria are met, then (5) weighting the pool and (6) storing said pool in the index.

The invention further includes computer system for creating an SBA 7 (a) index of floating rate pools comprising: (1) a computer processor for forming one or more candidate pools based on specific characteristics of SBA 7 (a) floating pools; said processor storing in a first database pools having specific characteristics of SBA 7 (a) floating rate pools; (2) said computer processor storing one or more selection criteria in a second database for use in determining the suitability of including the one or more candidate pools in an index; (3) said computer processor testing if the selection criteria are met by the one or more candidate pools, and if met then (5) weighting the pool and (6) storing in a third database the pool thus forming the index.

The present invention further relates to a method as implemented on a computer system for providing an index composed of U.S. dollar denominated SBA Guaranteed Floating Rate Pools, including one or more eligible pools included in the index having floating rate coupons, the Full Faith and Credit of the U.S. Government, and principal and interest (P & I) provided through a fund, such as a Master Reserve Fund, facilitated by a fiscal and/or transfer agent, said eligible pools having maturities longer than one (1) year, remaining loan pools having a portfolio of loans greater than 4 and a factor greater than 0.25%.

The invention further relates to a method as implemented on a computer system that periodically removes from the index, pools that have a loan count that falls below a certain number, such as by way of example five (5) or a pool factor that falls below 0.25%, in which case the specific pool breaks an established loan count or factor index rule.

The invention further relates to a method as implemented on a computer system that calculates at the time the pool is issued for inclusion in the index, a onetime Average Loan Size, to determine if the pool meets the minimum average loan initial size.

The invention further relates to a method as implemented on a computer system that calculates the index price on the offered side for each pool entered into the index.

The invention further relates to a method as implemented on a computer system that calculates for all SBA 7(a) pools already in the index a daily price on the bid side.

The invention further relates to a method as implemented on a computer system that calculates yields based upon the last 12 months CPR using a discounted cash flow method.

The invention further relates to an index of SBA 7(a) floating rate pools having a built-in delay, as for example an 84 day delay of which 54 days are without interest.

The invention further relates to an index of SBA 7(a) floating rate pools weighted by the actual outstanding balance of eligible pools.

The invention further relates to an eligible pool weighted based upon the index rules for liquidity, adjusted for the current month's factor for each pool and weighted in the indexes based on the current balance of the pool divided by the total amount of loan balances in the index.

The invention further relates to an index comprised of two sub-indexes determined by two distinct maturity cells.

The invention further relates to an index portfolio that is rebalanced at month-end for index rules, such as established by the selection criteria.

The invention further relates to a method as implemented on a computer system that includes new issues at month-end based upon compliance with index rules.

The invention further relates to a method as implemented on a computer system whereby issues may be excluded from the index at month-end due to non compliance with index rules established by the selection criteria.

The invention further relates to a method as implemented on a computer system that excludes an issue shorter than a fixed year period.

The invention further relates to a method as implemented on a computer system wherein on a periodic basis every pool in the index the previous month is reviewed for continued eligibility for the index using the criteria: 1) every pool evaluated for a current factor greater than a specified amount and every pool evaluated for a minimum remaining specified fixed loan count.

BRIEF DESCRIPTION OF THE DRAWINGS

Understanding of the present invention will be facilitated by consideration of the following detailed description of the preferred embodiments of the present invention taken in conjunction with the accompanying drawings wherein.

DETAILED DESCRIPTION

Figure 1:
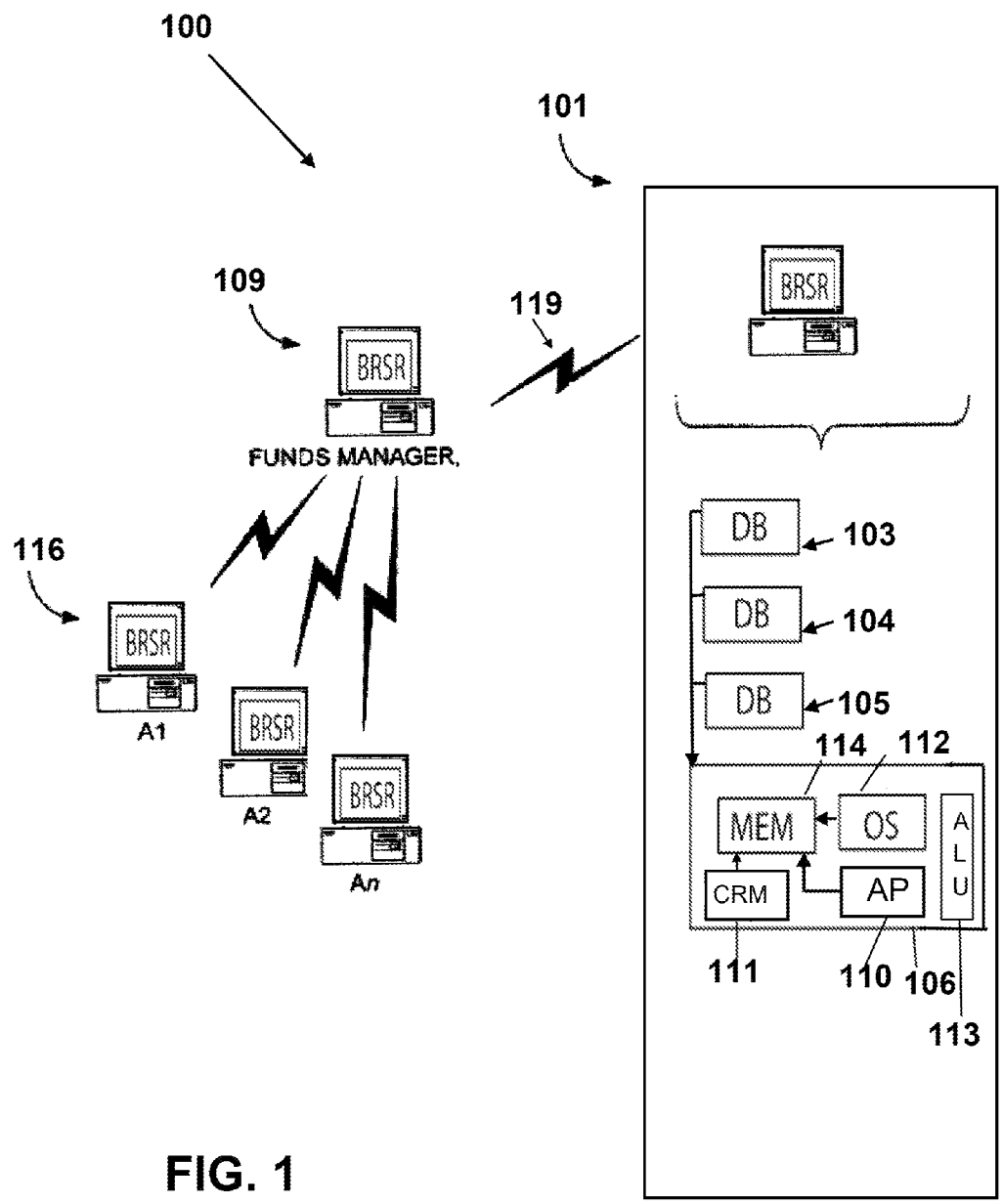
FIG. 1 is a block diagram of a computer system for creating and managing SBA 7(a) floating rate pool indexes according to an embodiment of the present invention.

It is to be understood that the figures and descriptions of the present invention have been simplified to illustrate elements that are relevant for a clear understanding, while eliminating, for the purpose of clarity, many other elements found in computing systems and methods of making computations. Those of ordinary skill in the art may recognize that other elements and/or steps may be desirable in implementing the present invention. However, because such elements and process steps are well known by those of ordinary skill in the art, and because they do not facilitate a better understanding of the present invention, a discussion of such elements and steps is not provided herein.

The following description includes the best mode of carrying out the invention. The detailed description is made for the purpose of illustrating the general principles of the invention and should not be taken in a limiting sense. The scope of the invention is determined by reference to the claims. Each part is assigned, even if structurally identical to another part, a unique reference number wherever that part is shown in the drawing figures.

Indices may, for example, serve as barometers for a given market or industry and benchmarks against which financial or economic performance is measured. The value of any given index may be arbitrarily set, just as the total shares of all securities in the index may be arbitrary. For ease and clarity throughout this document, however, the present embodiment presumes the value of the subject index equals 100. Furthermore, the selection criteria may over time change depending on new government laws, regulations and rules.

An index may be derived from a subset of a universe or pool of securities meeting at least one selection criterion, and may optionally be weighted according to another selection criterion. Although over different periods characteristics for pools can change, by way of example, SBA 7 (a) pools typically exhibit the following characteristics: (a) monthly principal P&I, (b) guaranteed timely P&I on a date certain such as the $25^{th}$ day of the month after an 85 day delay, (c) adjustable rate reset on a date certain such as the first business day of each month or calendar quarter, (d) due to a monthly or quarterly reset, SBA pools have 30 day or 90 day index durations, and (e) SBA recasts the amortization of each pool based on the final maturity of the pool and the net pool interest at each reset.

Reset SBA loans carry the unconditional full faith and credit guarantee of the U.S. government. Only the guaranteed portion of these loans can be sold by the underwriting lenders and pooled into SBA 7(a) pass through pools. The non-guaranteed portion of the SBA (a) loans can be sold to a thirdparty, however, the originating lender must retain a minimum of 5% of every loan and continue to service the loan over the life of the loan. Only the guaranteed SBA 7 (a) floating rate pools are eligible for these indexes, and are the subject of this invention.

FIG. 1 of the present invention relates to a system 100 for providing an SBA 7(a) floating rate pool index including: comprising: (1) a computer processor 101 for forming one or more candidate pools based on specific characteristics of SBA 7 (a) floating loan pools; said processor storing in a first database 103 loans having specific characteristics of SBA 7 (a) floating loan pools; (2) said computer processor storing a selection criteria in a second database 104 for use in determining the suitability of including the one or more candidate pools in an index; (3) said computer processor testing if the selection criteria are met by the one or more candidate pools, and if met then (5) weighting the pool and (6) storing in a third database 105, the pool thus forming the index.

Computer 101 includes a central processor unit (CPU) 106 having a memory 114, an arithmetic logic unit (ALU) 113, and input/output (I/O) devices (no shown) for accessing the databases 103, 104, and 105, executing an applications program 110 that determines the selection criteria, for selecting which pools are included in the index, a memoryl 14 that stores the applications program, an operating system 112, and the database data used during comparisons and calculations required to carry out the inventive method herein. The computer 101 also has the capability to communicate with other computer processors 109 via channel 119 utilizing direct telephone, satellite or Internet communication. Computer 109 may communicate with workstations 116, $A_1, A_2 \ldots A_n$ through which various funds, equity markets and other investments and the SBA 7 (a) floating pool indexes detailed herein.

The computer 101 may include any one or a combination of a personal computer, a mouse, a keyboard, a computer display, a touch screen, LCD, voice recognition software, or other generally represented by input/output devices required to implement the above functionality.

The software that executes a preferred embodiment of the invention resides in a non-transitory computer-readable medium 111 such as exemplified by memory 114 having stored thereon computer-readable instructions for implementing the method for: (1) forming one or more candidate pools based on specific characteristics of SBA 7 (a) floating loan pools; (2) determining a selection criteria for including one or more candidate pools in an index; (3) comparing the one or more candidate pools to the selection criteria, (4) and if the criteria is met, then (5) weighting the pool and (6) storing said pool in the index. The non-transitory computer-readable medium as exemplified by memory 114 having stored thereon computer-readable instructions commonly referred to as a program also may include program elements such as an operating system, a database management system and "device drivers" that allow the processor to interface with computer peripheral devices (e.g., a video display, a keyboard, a computer mouse, etc.).

Database 103 maintains the candidate pools having certain qualified characteristics, against which the selection criteria will be compared, to determine if the particular pool in the candidate pool will be included in the index. The database 104 maintains the selection criteria for inclusion and exclusion of the SBA 7 (a) floating pool from the index. Database 105 contains the index.

Computer memory 114 stores and maintains the criteria for weighting the indexes chosen for the indexes. Computer memory 114 also stores and maintains the data for the calculation of the daily index as such calculation relates to: income return, principal and interest return, price return, daily total return and index levels.

The computer 101 also contains within its memory 114, an operating system 112, and code for carrying out various functions in connection with embodiments of the invention herein as well as the databases 103, 104 and 105, and to store data relevant to calculations as associated with determining the composition of the index. Computer 101 includes at least one central processor or CPU 106, at least one communication port or hub, at least one random access memory (RAM), at least one read-only memory (ROM). Typically the computer 101 is a conventional standalone computer however, it may alternatively function as a server whose operation may be distributed across multiple computing systems and architectures, that combined achieve the function described herein as to creating an SBA 7(a) floating rate index.

The CPU 106, such as one or more conventional microprocessors and one or more supplementary co-processors such as math co-processors. Additionally the CPU 106 has means such as arithmetic logic unit (ALU) 113 for calculating and logical registers for addressing and retrieving and storing data in the one or more databases. The CPU 106 typically is in communication with a communication port through which the CPU 106 communicates with other devices such as other servers, user terminals or devices 109. The communication port may include multiple communication channels 119 for simultaneous communication with, for example, other processors, servers or client terminals. As stated, devices in communication with each other need not be continually transmitting to each other. On the contrary, such devices need only transmit to each other as necessary, may actually refrain from exchanging data most of the time, and may require several steps to be performed to establish a communication link between the devices.

The CPU 106 also is in communication with one or more data storage devices. The data storage devices may comprise an appropriate combination of magnetic, optical and/or semiconductor memory, and may include, for example, RAM, ROM, flash drive, an optical disc such as a compact disc and/or a hard disk or drive. The processors and the data storage devices each may be, for example, located entirely within a single computer or other computing device; or connected to each other by a communication medium, such as a USB port, serial port cable, a coaxial cable, a Ethernet type cable, a telephone line, a radio frequency transceiver or other similar wireless or wired medium or combination of the foregoing.

The data storage devices such as store databases 103, 104 and 105 and memory 114 may store, for example, (i) the program (e.g., computer program code and/or a computer program product) adapted to direct the processor in accordance with the present invention, and particularly in accordance with the methods and processes described in detail hereinafter; (ii) the databases (103, 104, 105) adapted to store information that may be utilized to store information required by the program. The databases include multiple records, each record including fields specific to the present invention such as SBA 7 (a) floating rate pools, selection criteria, financial objectives, indexes, and report data, etc.

The program may be stored, for example, in a compressed, an uncompiled and/or an encrypted format, and may include computer program code. The instructions of the program may be read into a main memory of the CPU 106 from a computer-readable medium other than the data storage device, such as from a ROM or from a RAM. While execution of sequences of instructions in the program causes the processor to perform the process steps described herein, hard-wired circuitry may be used in place of, or in combination with, software instructions for implementation of the processes of the present invention. Thus, embodiments of the present invention are not limited to any specific combination of hardware and software.

Suitable computer application program 110 code may be provided for performing numerous functions such as alternative steps of invention. The computer program code required to implement the above functions (and the other functions described herein) can be developed by a person of ordinary skill in the art, and is not described in detail herein.

The term "computer-readable medium" as used herein refers to any medium that provides or participates in providing instructions to the processor of the computing device (or any other processor of a device described herein) for execution. Such a medium may take many forms, including but not limited to, non-volatile media, volatile media, and transmission media. Non-volatile media include, for example, optical or magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, a carrier wave as described hereinafter, or any other medium from which a computer can read.

In addition to memory 114, various forms of computer readable media may be involved in carrying one or more sequences of one or more instructions to the processor (or any other processor of a device described herein) for execution. For example, the instructions may initially be borne on a magnetic disk of a remote computer. The remote computer can load the instructions into its dynamic memory and send the instructions over an Ethernet connection, cable line, or even telephone line using a modem. A communications device local to a computing device (or, e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Figure 2:
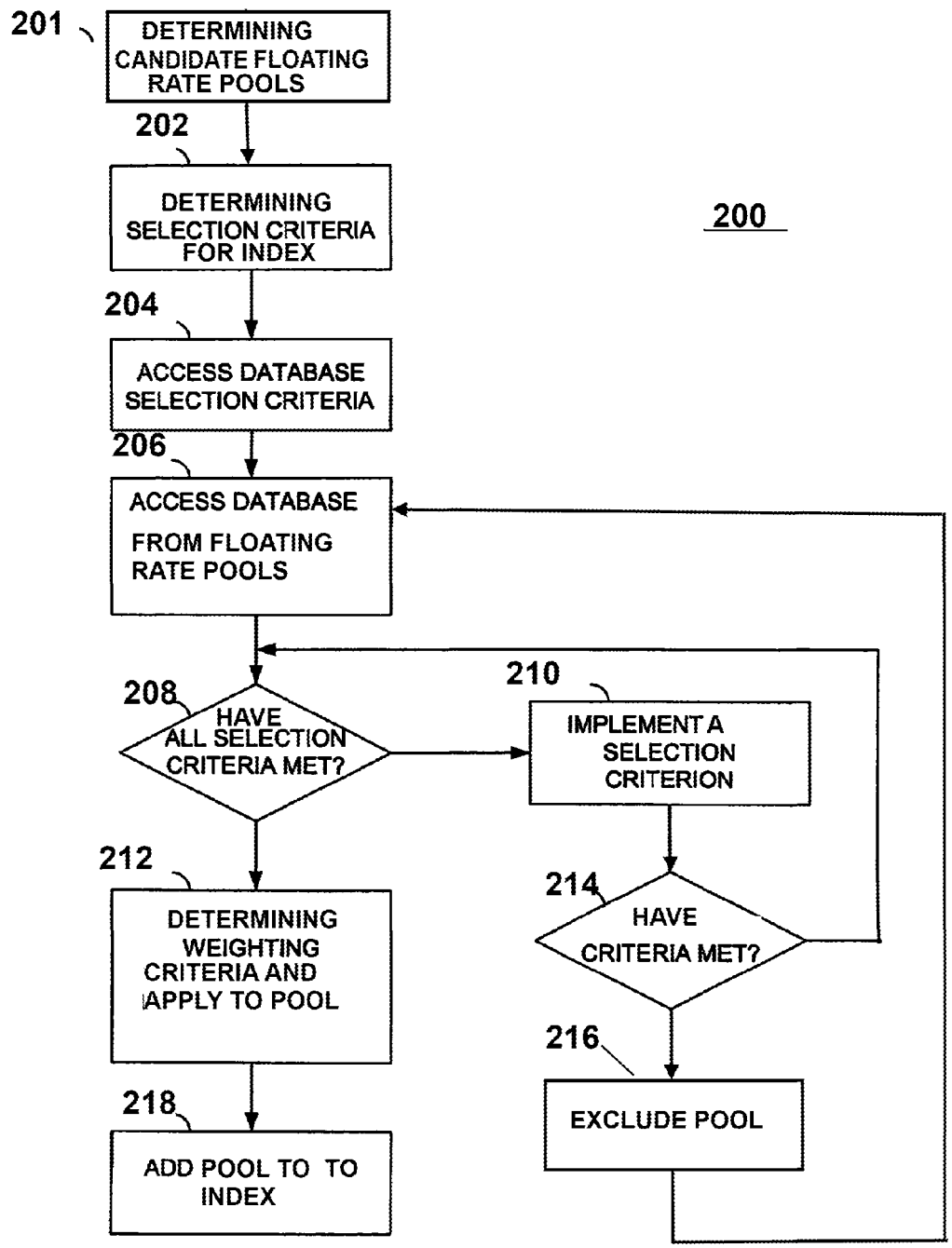
FIG. 2 is a flow chart of a method for creating SBA 7(a) floating rate pool indexes according to an embodiment of the present invention.

FIG. 2 illustrates method 200 a non limiting embodiment of the invention, utilizing a selection criteria indicated above, wherein step 201 includes creating database 104 from the universe of SBA 7 (a) pools to form candidate pools by determining if a particular pool meets general and specific characteristics, such as by way of example it: (1) is an SBA 7 (a) U.S. dollar guaranteed floating rate pool, (2) meets the full faith and credit backed by the U.S. government, (3) states principal and interest, where interest accrues uses a 30/360 day count convention, (4) has a maturity greater than a given number of years, by way of example and not imitation, one (1) year and a remaining number of loans greater than a given factor, by way of example and not limitation a factor of 0.25%, (5) a pool loan count of at least a given amount, by way of example and not limitation, five (5), has value greater than a given amount, such as by way of example and not limitation $10,000,000, and (7) has an average loan size greater than, by way of example and not limitation, $250,000, (8) is not a "pool of pools" or private securitization of SBA Pools.

Following identification of the pools having the general and specific qualifying characteristics, in step 201, the method then it determines if those loans meet a list of selection criteria in Determining Selection Criteria for Index step 202 as follows:

One embodiment of the invention utilizes, as a selection criteria, a rule of inclusion in the index that to remain in the index as an eligible pool a minimum of five (5) loans remain with a 0.25 factor or greater.

One embodiment of the invention, includes as selection criteria, a rule of inclusion in the index has a onetime Average Loan Size. This calculation is accomplished only at the time the pool is tested for inclusion in the index for the first time. By way of example, the calculation may be a simply division of the original face amount of the entire issue and divided by starting load count of the issue. The result must be grated that a fixed dollar amount.

Furthermore, a selection criteria for inclusion in the index is that a pool have loan count that does not fall below five (5) or a pool factor that falls below 0.25%. If, initially or at the end of each month, in which the specific pool breaks the loan count or factor index, the pool is ineligible for inclusion in the index. No issue shorter that a fix year period, by way of example 10 years to maturity, can enter the indexes.

On a scheduled basis, as for example, each month, a new SBA 7 (a) Floating Rate Pool is reviewed for Index Eligibility in the following order: (1) Original Size of the Pool in dollars, (2) Minimum Loan Count, (3) Minimum Average Starting Loan Size (Original pool size/Original Loan Count) greater than a specified dollar amount, as by way of example $250,000.

In Access Database Selection Criteria step 204 the computer 101 program 110 accesses database 103 containing the specific selection criteria set forth above. In Access Database From Floating Rate Pools step 206 the computer 101 program 110 accesses database 103 containing a candidate floating rate pool. In Have All Selection Criteria Met step 208 the computer 101 program 110 determines if the selected candidate pool has met each selection criteria set forth in step 202 and if not then the computer 101 program 110 chooses one of the criterion listed in step 202 and in Criteria Met step 214 tests if the selection criterion has been met, and if not then Exclude Pool step 216 excludes the pool and the process of selecting a pool for inclusion in the index begins again at step 206, whereby another pool is selected. If the Has Criteria Met step 214, indicates that the criteria has been met then the computer 101 program 110 checks the pool against another selection criterion in the list as provided in step 202. The process continues until either a pool is excluded in step 214 or all the selection criteria established in step 202 have been met by the particular pool. The selected pool is then weighted in step 212 and added to the database 105 as an indexed pool in step 218.

The index is weighted by the actual outstanding balance of eligible pools. Each eligible pool is weighted based upon the index rules for liquidity, adjusted for the current month's factor for each pool and weighted in the indexes based on the current balance of the pool divided by the total amount of loan balances in the index. In Determine Weight Criteria and Apply to Pool step 212 the computer 101 program 110 accesses from memory a factor to adjust the liquidity of the pool for the current month based on the current dollar loan balance of the pool divided by the total amount of the loans balances in the index. Once the pool is weighted it is stored in memory with an associated weight parameter in database 105.

The index is made up of two sub-indexes determined by two distinct maturity cells: as by way of example 10.00 to 14.99 and 15.00 to 25 years. Once a pool is in a specific maturity cell, it will remain regardless of the remaining maturity. The two cells separate SBA real estate loans (>15 years) from SBA working capital, plant and equipment loans (<15 years). Historically borrowers have demonstrated different payment behavior for to categories of funding. The maturity cells segregate loan categories to track their performance; however, both sub-indexes are combined to create the SBA 7 (a) floating rate pool market performance.

The index is rebalanced at month-end for index rules, i.e., the method from steps 206 through 218 is repeated using the portfolio of pools stored in database 105 that were previously included and exist in the index. New issues may enter at month-end due to selection criteria index rules. Issues may also leave at month-end due to selection criteria index rules.

Once the index is established the index of pools is monetized and defined in terms of its quantifiable parameters as follows by way of example and not limitation:

(1) All pools enter the index priced on the offering side. All pools already in the index are priced daily on the bidding side.

(2) Yields are calculated based upon the last 12 months CPR using a discounted cash flow method (DFC). SBA 7(a) pools have a built in delay as for example an 84 day delay of which 54 days are without interest.

(3) Income Return equals: 100 times (End Accrued less Beginning Accrued plus Interest Payment) divided by the Beginning market Value.

(4) Principal Return equals 100 times (Principal Payment less Principal Payment times Beginning Price) divided by Beginning Market Value.

(5) Price Return equals 100 times (End Principal Balance times End Price) less End Principal Balance times Beginning Price) divided by Beginning Market Value.

(6) Daily Total Return equals 100 times (End Market Value divided by Beginning Market Value less one).

(7) End Market Value equals (Beginning Principal Balance times Beginning Price) plus Beginning Accrued.

(8) All index levels start at 100 and are based on the daily total return behavior of each index. Total returns are based on price return plus income return plus principle return. Each index total return is calculated daily. The daily returns are reinvested and compounded back into each index on a multiplicative basis: Beginning Index Level times (1 plus Daily Return divided by 100)=End Index Level.

(9) Cumulative Total Return equal 100 times (Ending Index Level divided by Beginning Index Level less 1).

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A computer-implemented method operable in a computer having at least one processor for creating a Small Business Administration 7 (a) index of floating rate loan pools, said method causing said computer to execute the steps of:

(1) forming one or more candidate pools based on specific characteristics of Small Business Administration 7 (a) floating rate loan pools;

(2) determining one or more selection criteria for including one or more candidate pools in an index;

(3) comparing the one or more candidate pools to the one or more selection criteria;

(4) and if the selection criteria are met, then (5) weighting the pool and (6) storing said pool in the index.

2. The computer-implemented method of claim 1, further comprising forming candidate pools by determining if a particular pool is an Small Business Administration 7 (a) U.S. dollar guaranteed floating rate pool.

3. The computer-implemented method of claim 1, further comprising forming candidate pools by determining if a particular pool states principal and interest.

4. The computer-implemented method of claim 1, further comprising forming candidate pools by determining if a particular pool has a maturity greater than a given number of years.

5. The computer-implemented method of claim 1, further comprising forming candidate pools by determining if a particular pool has a factor of at least 0.25%.

6. The computer-implemented method of claim 1, further comprising forming candidate pools by determining if a particular pool has a pool loan count of at least a given amount.

7. The computer-implemented method of claim 1, further comprising forming candidate pools by determining if a particular pool value is greater than a given amount.

8. The computer-implemented method of claim 1, further comprising forming candidate pools by determining if a particular pool is not one of a "pool of pools" or private securitization of Small Business Administration pools.

9. The computer-implemented method of claim 1, further comprising forming said index by weighting the actual outstanding balance of eligible pools.

10. The computer-implemented method of claim 1, further comprising forming said index by adjusting the liquidity of the pool for the current month based on the current dollar loan balance of the pool divided by the total amount of the loans balances in the index.

11. The computer-implemented method of claim 1, further comprising creating said index by forming one or more sub-indexes determined by distinct maturity cells.

12. The computer-implemented method of claim 1, further comprising forming said index by periodically rebalancing for compliance with the selection criteria.

13. The computer-implemented method of claim 1, further comprising monetizing the index portfolio by initially entering the index price on an offering side.

14. The computer-implemented method of claim 1, further comprising monetizing the index portfolio by entering a price for all pools in the index daily on a bidding side.

15. The computer-implemented method of claim 1, further comprising monetizing the index portfolio by calculating yields based upon the last 12 months constant prepayment rate using a discounted cash flow method.

16. The computer-implemented method of claim 1, further comprising monetizing the index portfolio by calculating income return.

17. The computer-implemented method of claim 1, further comprising monetizing the index portfolio by calculating a principal return.

18. The computer-implemented method of claim 1, further comprising monetizing the index portfolio by calculating a price return.

19. The computer-implemented method of claim 1, further comprising monetizing the index portfolio by calculating a daily total return.

20. The computer-implemented method of claim 1, further comprising monetizing the index portfolio by calculating an end market value.

21. The computer-implemented method of claim 1, further comprising monetizing the index portfolio by calculating a cumulative total return.

22. A non-transitory computer-readable medium having stored thereon computer-readable instructions for implementing a method comprising: (1) forming one or more candidate pools based on specific characteristics of Small Business Administration 7 (a) floating rate pools; (2) determining one or more selection criteria for including one or more candidate pools in an index; (3) comparing the one or more candidate pools to the one or more selection criteria, (4) and if the selection criteria are met, then (5) weighting the pool and (6) storing said pool in the index.

23. A computer system for creating an Small Business Administration 7 (a) index of floating rate pools comprising: (1) a computer processor for forming one or more candidate pools based on specific characteristics of Small Business Administration 7 (a) floating rate pools; said processor storing in a first database pools having specific characteristics of Small Business Administration 7 (a) floating rate pools; (2) said computer processor storing one or more selection criteria in a second database for use in determining whether to include the one or more candidate pools in an index; (3) said computer processor testing if the selection criteria are met by the one or more candidate pools, and if met then (5) weighting the pool and (6) storing in a third database the pool thus forming the index.

\* \* \* \* \*